US012667955B2

(12) United States Patent
Shen

(10) Patent No.: US 12,667,955 B2
(45) Date of Patent: Jun. 30, 2026

(54) PORTABLE DETACHABLE TOOL BOX AND ASSEMBLY PROCESS THEREOF

(71) Applicant: ZHEJIANG DINGDA INDUSTRIAL CO., LTD, Zhejiang (CN)

(72) Inventor: Dingxun Shen, Zhejiang (CN)

( * ) Notice: Subject to any disclaimer, the term of this patent is extended or adjusted under 35 U.S.C. 154(b) by 0 days.

(21) Appl. No.: 19/010,678

(22) Filed: Jan. 6, 2025

(65) Prior Publication Data

US 2026/0131449 A1 May 14, 2026

(30) Foreign Application Priority Data

Nov. 12, 2024 (CN) ......................... 202411607878.1

(51) Int. Cl.
*B25H 3/02* (2006.01)

(52) U.S. Cl.
CPC ............. *B25H 3/027* (2013.01); *B25H 3/028* (2013.01)

(58) Field of Classification Search
CPC .......... B25H 3/027; B25H 3/028; B25H 3/00; B25H 3/02
USPC ............. 206/372, 349, 371, 373; 248/346.3; 312/265.6, 350
See application file for complete search history.

(56) References Cited

U.S. PATENT DOCUMENTS

| | | | | |
|---|---|---|---|---|
| 3,186,782 A * | 6/1965 | Ullman, Jr. | A47B 47/03 | 312/351 |
| 8,714,355 B2 * | 5/2014 | Huang | B25H 3/028 | 312/111 |
| 8,967,743 B2 * | 3/2015 | Bernett | A47B 17/00 | 312/265.6 |
| 2006/0186776 A1 * | 8/2006 | Tsai | A47B 67/04 | 312/408 |
| 2010/0282629 A1 * | 11/2010 | Grela | A47B 47/02 | 312/294 |
| 2015/0108881 A1 * | 4/2015 | Chang | G09F 3/00 | 312/219 |
| 2022/0297283 A1 * | 9/2022 | Chen | B25H 3/02 | |
| 2024/0269821 A1 * | 8/2024 | Li | B25H 3/028 | |

* cited by examiner

*Primary Examiner* — Rafael A Ortiz

(57) ABSTRACT

A portable detachable tool box, comprising a box assembly and a drawer assembly, wherein the box assembly comprises a box bottom plate, a box side plate detachably provided on both sides of the box bottom plate, a box back plate detachably plugged into the box bottom plate, and a box top plate detachably matched to tops of the box side plates and the box back plate; a drawer cavity is formed between the box bottom plate, the box side plates, the box back plate, and the box top plate; the box side plates are bent toward an inner side of the drawer cavity and are formed with drawer guide grooves; the drawer assembly comprises a plurality of detachable drawer units, which are stacked in sequence from top to bottom in the drawer cavity through the drawer guide grooves.

9 Claims, 5 Drawing Sheets

PORTABLE DETACHABLE TOOL BOX AND ASSEMBLY PROCESS THEREOF

TECHNICAL FIELD

The invention related to the technical field of tool boxes, and in particular to a portable detachable tool box.

BACKGROUND ART

Tool boxes are suitable for the fixed location management of tools, knives, and parts in the production site, so that storage and retrieval of items can be truly timely, accurate, efficient, and low-cost. People often use tool boxes to carry tools, which not only can carry many tools at a time, but also saves manpower and effort. Tool boxes are widely used in various transportation occasions. In order to carry more tools, people make the body of the tool cart into several layers to carry more tools.

Traditional tool boxes have the following problems: first, storage drawers can only be fixedly installed in a certain position of the box and pulled out through guide rails; neither the number nor the storage space of the storage drawers can be adjusted, and the storage drawers are installed by pulling them out horizontally through guide rails. Second, the disassembly and assembly of the various parts of the toolbox are not thorough enough, and they still take up too much space when stacked up, which is not suitable for shipping in large quantities in containers. Therefore, further optimization is urgently needed.

SUMMARY OF THE INVENTION

The purpose of the invention is to solve the shortcomings of the prior art and to propose a portable detachable tool box with reasonable structural design, complete box disassembly and assembly, small stacking space, and storage drawers that can be folded and stacked from top to bottom.

In order to solve the above technical problems, the invention provides the following technical solutions:

a portable detachable tool box, comprising a box assembly and a drawer assembly, wherein the box assembly comprises a box bottom plate, a box side plate detachably provided on both sides of the box bottom plate, a box back plate detachably plugged into the box bottom plate, and a box top plate detachably matched to tops of the box side plates and the box back plate; a drawer cavity is formed between the box bottom plate, the box side plates, the box back plate, and the box top plate; the box side plates are bent toward an inner side of the drawer cavity and are formed with drawer guide grooves; the drawer assembly comprises a plurality of detachable drawer units, which are stacked in sequence from top to bottom in the drawer cavity through the drawer guide grooves.

Preferably, the box top plate is detachably connected with a drawer stopper rod for limiting the drawer unit, and one end of the drawer stopper rod is buckled on the box bottom plate.

Preferably, the drawer unit comprises a guide rail frame assembly and a drawer seat detachably provided on the guide rail frame assembly; the guide rail frame assembly comprises a guide rail main frame, a guide rail auxiliary frame detachably provided on the guide rail main frame, and a guide rail provided between the guide rail main frame and the guide rail auxiliary frame; the guide rail main frame is slidably matched in the drawer guide groove, and the guide rail auxiliary frame is detachably connected to the drawer seat.

Preferably, the drawer seat comprises a drawer seat plate and a handle groove provided on one side of the drawer seat plate; the drawer seat plate is bent and is cooperated with the guide rail auxiliary frame to form a U-shaped storage cavity.

Preferably, left and right sides of the box bottom plate are bent outwards to form U-shaped clamping grooves for the box side plates to be clamped; a front side of the box bottom plate is bent inwards to form a clamping flange, and the box bottom plate is also provided with inserting holes for the box back plate to be inserted into.

Preferably, the box back plate comprises two back plate pieces abutting against each other, and a bottom of the back plate piece is provided with an inserting sheet.

Preferably, the guide rail main frame is formed by bending a guide rail main plate with four sides that can be bent toward one side of the box side plate to form a support frame.

Preferably, the guide rail auxiliary frame is formed by bending a guide rail auxiliary plate with four sides that can be bent toward one side of the drawer cavity to form a mounting frame.

Preferably, a bottom of the box bottom plate is provided with roller installation positions, and the box side plate is detachably provided with a push-pull handrail.

Preferably, an assembly process of the portable detachable tool box, including the following steps:

S1: first, fitting the two box side plates to the box bottom plate through the U-shaped clamping grooves, and fixing the box side plates and box bottom plate through screw holes at the bottom;

S2: then, stacking the plurality of drawer units in sequence from top to bottom through the drawer guide grooves of the box side plates;

S3: then, inserting the two back plate pieces into the box bottom plate through the inserting holes;

S4: finally, placing the box top plate on the drawer units through the drawer guide grooves of the box side plates, and fixing the box top plate, the box side plates, and the box back plate through screw holes on the top.

Compared with the prior art, the invention has the following beneficial effects:

the portable detachable tool box of the invention can realize complete assembling and disassembling of the box assembly and the drawer assembly constituting the tool box, which greatly reduces the space occupied by stacking and packaging, facilitates batch container shipment, and greatly reduces transportation costs.

When the portable detachable tool box of the invention is in use, first assembling the box bottom plate and the box side plates, then stacking the several drawer units of the drawer assembly in the drawer cavity from top to bottom in sequence through the drawer guide grooves, then installing the box back plate, and finally installing and fixing the box top plate, thus completing the assembly of the entire tool box. The assembly is very simple and the working effect is high.

BRIEF DESCRIPTION OF THE INVENTION

SPECIFIC EMBODIMENT OF THE INVENTION

The technical solutions in the embodiments of the invention will be clearly and completely described hereinafter with reference to the drawings in the embodiments of the invention. Obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

Figure 1:
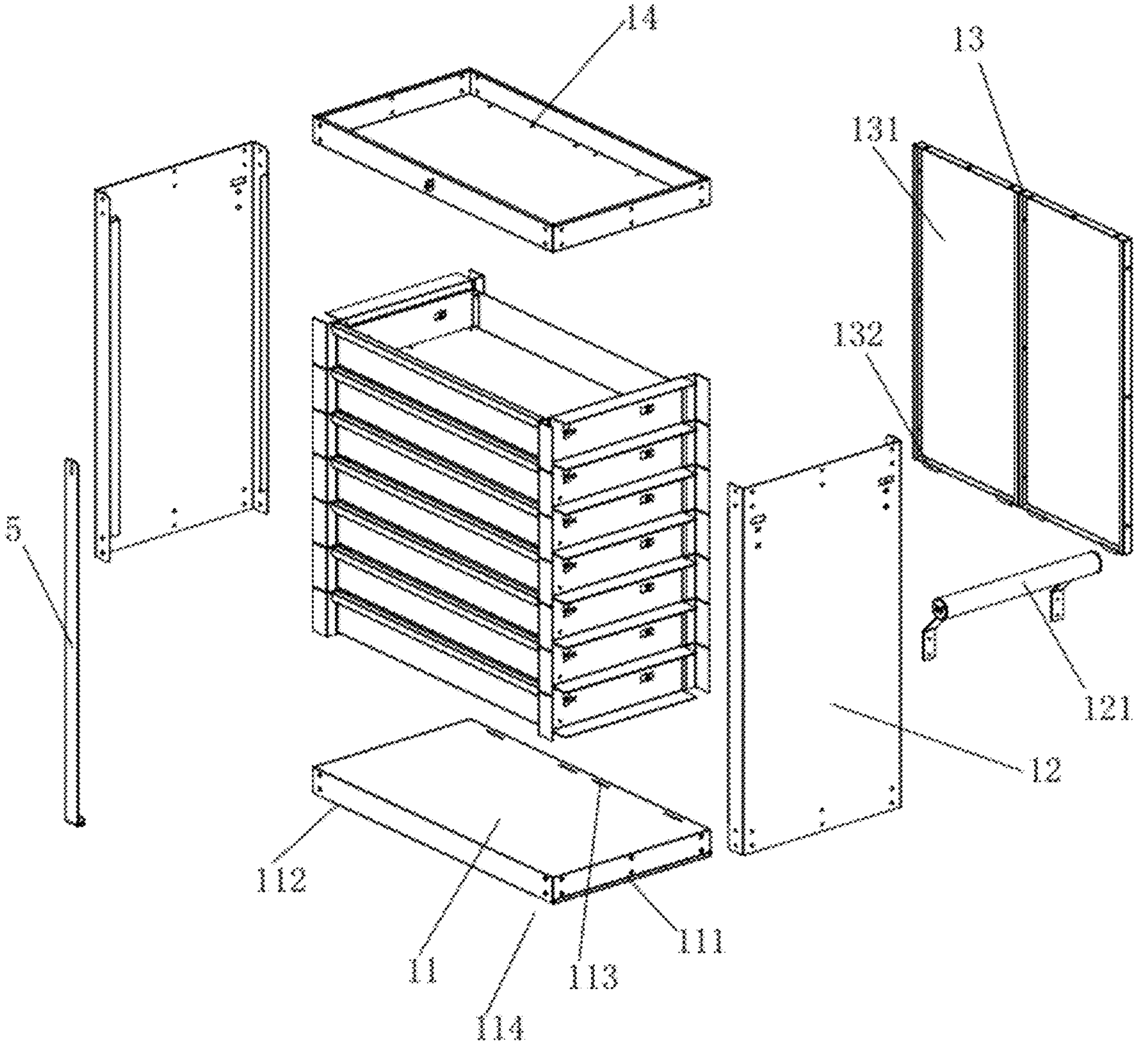
FIG. 1 is an exploded view of the portable detachable tool box according to the invention.
Figure 2:
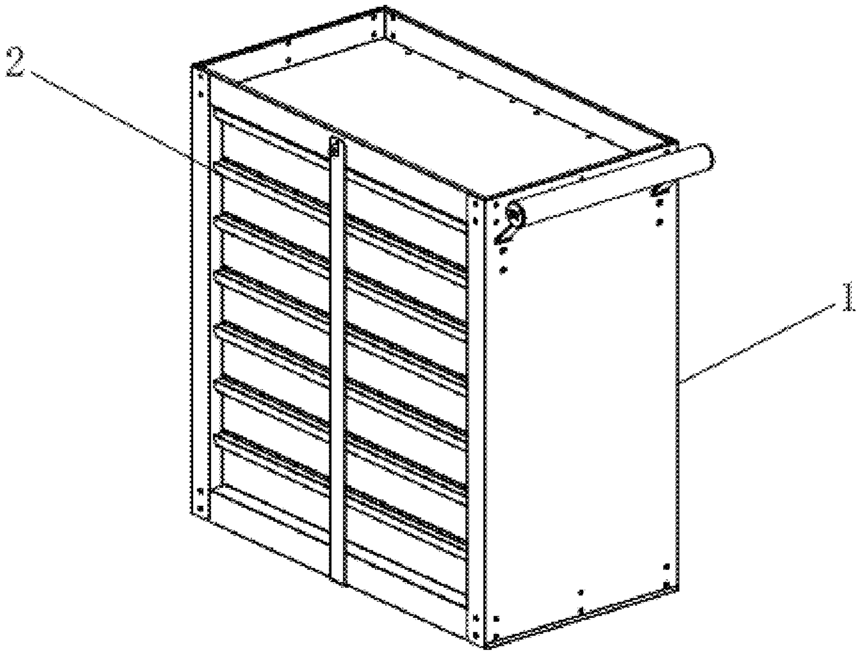
FIG. 2 is an assembly diagram of the portable detachable tool box according to the invention.
Figure 3:
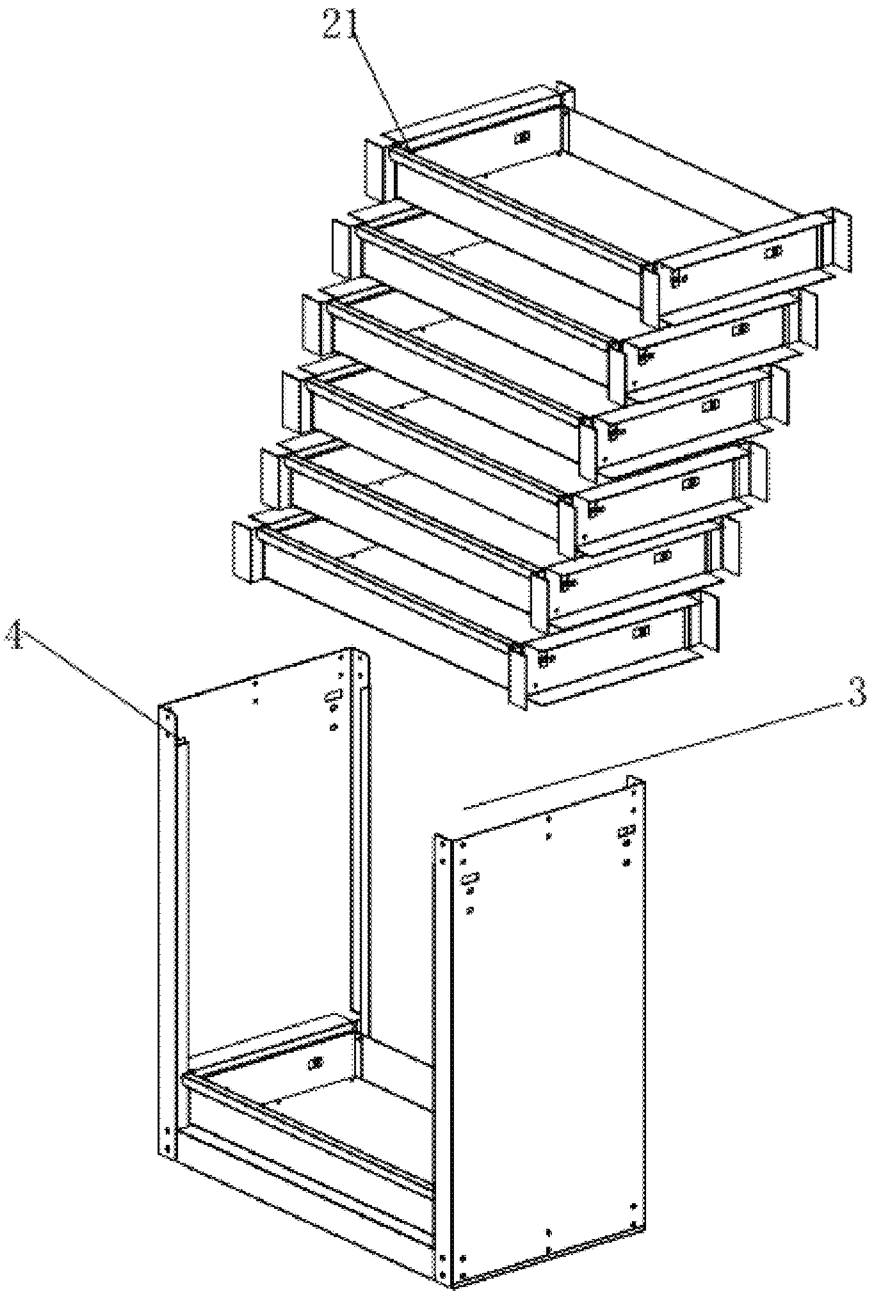
FIG. 3 is an assembly diagram of the drawer assembly according to the invention.
Figure 4:
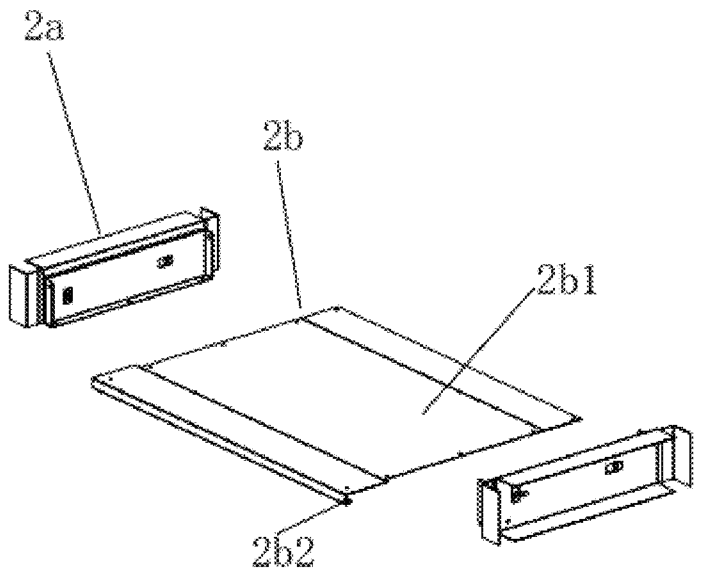
FIG. 4 is a first exploded view of the drawer unit according to the invention.
Figure 5:
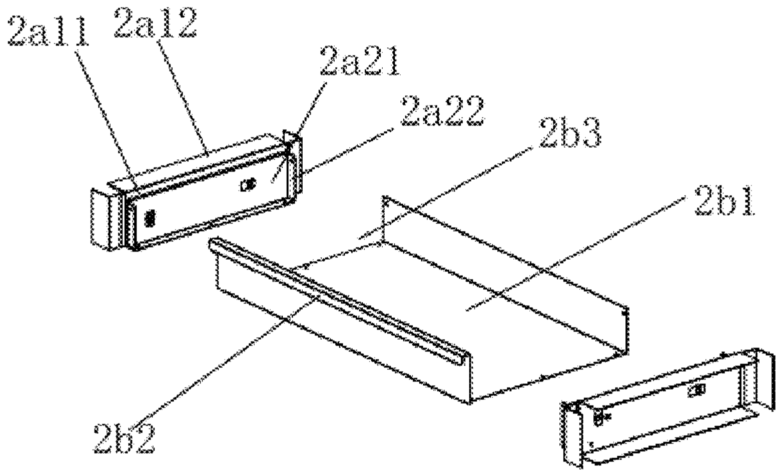
FIG. 5 is a second exploded view of the drawer unit according to the invention.
Figure 6:
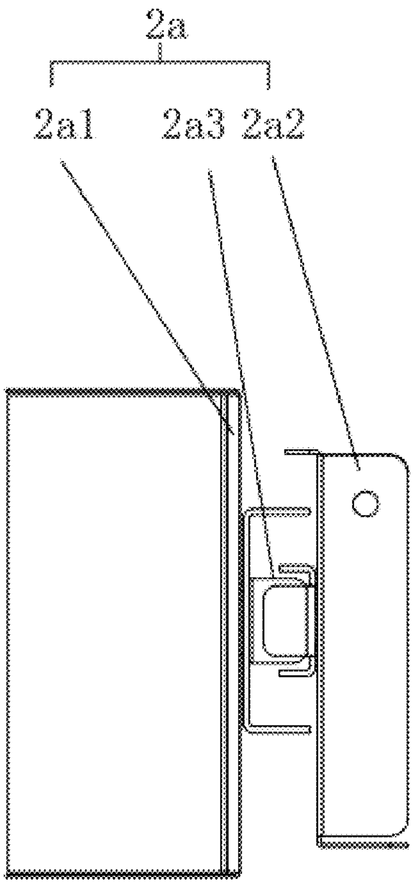
FIG. 6 is a schematic diagram of the guide rail frame assembly according to the invention.

With reference to FIGS. 1-6, a portable detachable tool box, comprising a box assembly 1 and a drawer assembly 2, wherein the box assembly 1 comprises a box bottom plate 11, a box side plate 12 detachably provided on both sides of the box bottom plate 11, a box back plate 13 detachably plugged into the box bottom plate 11, and a box top plate 14 detachably matched to tops of the box side plates 12 and the box back plate 13; a drawer cavity 3 is formed between the box bottom plate 11, the box side plates 12, the box back plate 13, and the box top plate 14; the box side plates 12 are bent toward an inner side of the drawer cavity 3 and are formed with drawer guide grooves 4; the drawer assembly 2 comprises a plurality of detachable drawer units 21, which are stacked in sequence from top to bottom in the drawer cavity 3 through the drawer guide grooves 4. The assembly process of the portable detachable tool box of the invention is as follows: first, fixing the box side plates 12 to the left and right sides of the box bottom plate 11, and then stacking a plurality of drawer units 21 in the drawer cavity 3 from top to bottom through the drawer guide grooves 4. Since the box side plates 12 are bent and formed with drawer guide grooves 4 for the drawer units 21 to be stacked and limited in sequence, the box back plate 13 is plugged into the box bottom plate 11, and finally the box top plate 14 is fixedly connected with the box side plates 12 and the box back plate 13 to complete the assembly of the entire tool box. The assembly is very simple and the working effect is high. The tool box of the invention can also be disassembled and assembled in all directions, and the disassembly and assembly are very thorough, which greatly reduces the space occupied by stacking and packaging, facilitates batch container shipment, and greatly reduces transportation costs.

The box top plate 14 is detachably connected with a drawer stopper rod 5 for limiting the drawer unit 21, and one end of the drawer stopper rod 5 is buckled on the box bottom plate 11. A top of the box top plate 14 is concave and can also form a groove for storage, and a side of the box top plate 14 close to the handle is provided with a circular protrusion and is detachably connected with the through hole on the drawer stopper rod 5.

The drawer unit 21 comprises a guide rail frame assembly **2*a* and a drawer seat 2*b* detachably provided on the guide rail frame assembly 2*a*; the guide rail frame assembly 2*a* comprises a guide rail main frame 2*a*1, a guide rail auxiliary frame 2*a*2 detachably provided on the guide rail main frame 2*a*1, and a guide rail 2*a*3 provided between the guide rail main frame 2*al* and the guide rail auxiliary frame 2*a*2; the guide rail main frame 2*al* is slidably matched in the drawer guide groove 4, and the guide rail auxiliary frame 2*a*2 is detachably connected to the drawer seat 2*b*. The number and storage space of the drawer units 21 can be adjusted by adjusting the guide rail frame assembly 2*a*. Specifically, the number of drawer units 21 can be reduced by increasing the height of the guide rail main frame 2*al*, and the corresponding cavity capacity of the drawer seat 2*b* will be larger. Conversely, the number of drawer units 21 can be increased, and the corresponding cavity capacity of the drawer seat 2*b* will be smaller. The main body of the drawer unit 21 can be disassembled in all directions, and can also be directly stacked and assembled through the drawer guide grooves 4**, which is simple to combine and has a very reasonable design.

The drawer seat **2*b* comprises a drawer seat plate 2*b*1 and a handle groove 2*b*2 provided on one side of the drawer seat plate; the drawer seat plate 2*b*1 is bent and is cooperated with the guide rail auxiliary frame 2*a*2 to form a U-shaped storage cavity 2*b*3. The drawer seat 2*b* is assembled by bending the drawer seat plate 2*b*1 to form a U-shaped storage cavity 2*b*3**, which greatly reduces the space occupied by the stacking of packages.

Left and right sides of the box bottom plate 11 are bent outwards to form U-shaped clamping grooves 111 for the box side plates 12 to be clamped; a front side of the box bottom plate 11 is bent inwards to form a clamping flange 112 for the drawer stopper rod 5 to be clamped into, and the box bottom plate 11 is also provided with inserting holes 113 for the box back plate 13 to be inserted into. The arrangement of the clamping flange, the clamping grooves and the inserting holes 113 on the box bottom plate 11 facilitates the installation of each plate and makes the assembly more stable.

The box back plate 13 comprises two back plate pieces 131 abutting against each other, and a bottom of the back plate piece 131 is provided with an inserting sheet 132 to be inserted with the inserting hole. The box back plate 13 is composed of two back plate pieces 131, which reduces the width required for packaging of a single plate piece and also greatly reduces the space occupied by packaging stacking, making it easier to transport in containers.

The guide rail main frame **2*al* is formed by bending a guide rail main plate 2*a*11 with four sides that can be bent toward one side of the box side plate 12 to form a support frame 2*a*12. The height of the support frame 2*a*12** can be adjusted to adjust the number of storage cavities and the storage space.

The guide rail auxiliary frame **2*a*2 is formed by bending a guide rail auxiliary plate 2*a*21 with four sides that can be bent toward one side of the drawer cavity 3 to form a mounting frame 2*a*22. The mounting frame 2*a*22 facilitates assembly and disassembly with the drawer seat 2*b***.

A bottom of the box bottom plate 11 is provided with roller installation positions 114 (not shown in the figures), and the box side plate 12 is detachably provided with a push-pull handrail 121, which also makes transport easier.

An assembly process of the portable detachable tool box, including the following steps:

S1: first, fitting the two box side plates 12 to the box bottom plate 11 through the U-shaped clamping grooves 111, and fixing the box side plates 12 and box bottom plate 11 through screw holes at the bottom;

S2: then, stacking the plurality of drawer units 21 in sequence from top to bottom through the drawer guide grooves 4 of the box side plates 12 to realize the overall placement of the drawer assembly 2;

S3: then, inserting the two back plate pieces 13 into the box bottom plate 11 through the inserting holes 113 of the box bottom plate 11;

S4: finally, placing the box top plate 14 on the top drawer unit 21 through the drawer guide grooves 4 of the box side plates 12, and fixing the box top plate 14, the box side plates 12, and the box back plate 13 through screw holes on the top to complete the assembly of the whole tool box.

Although the embodiments of the invention have been shown and described, for those of ordinary skill in the art, it can be understood that various changes, modifications, and substitutions can be made to these embodiments without departing from the principle and spirit of the invention. The protection scope of the invention is defined by the appended claims and the equivalents thereof.

The invention claimed is:

1. A portable detachable tool box, comprising a box assembly and a drawer assembly, wherein the box assembly comprises a box bottom plate, a box side plate detachably provided on both sides of the box bottom plate, a box back plate detachably plugged into the box bottom plate, and a box top plate detachably matched to tops of the box side plates and the box back plate; a drawer cavity is formed between the box bottom plate, the box side plates, the box back plate, and the box top plate; the box side plates are bent toward an inner side of the drawer cavity and are formed with drawer guide grooves; the drawer assembly comprises a plurality of detachable drawer units, which are stacked in sequence from top to bottom in the drawer cavity through the drawer guide grooves;

the box top plate is detachably connected with a drawer stopper rod for limiting the drawer unit, and one end of the drawer stopper rod is buckled on the box bottom plate.

2. The portable detachable tool box of claim 1, wherein the drawer unit comprises a guide rail frame assembly and a drawer seat detachably provided on the guide rail frame assembly; the guide rail frame assembly comprises a guide rail main frame, a guide rail auxiliary frame detachably provided on the guide rail main frame, and a guide rail provided between the guide rail main frame and the guide rail auxiliary frame; the guide rail main frame is slidably matched in the drawer guide groove, and the guide rail auxiliary frame is detachably connected to the drawer seat.

3. The portable detachable tool box of claim 2, wherein the drawer seat comprises a drawer seat plate and a handle groove provided on one side of the drawer seat plate; the drawer seat plate is bent and is cooperated with the guide rail auxiliary frame to form a U-shaped storage cavity.

4. The portable detachable tool box of claim 1, wherein, and the box bottom plate is also provided with inserting holes for the box back plate to be inserted into.

5. The portable detachable tool box of claim 1, wherein the box back plate comprises two back plate pieces abutting against each other.

6. The portable detachable tool box of claim 2, wherein the guide rail main frame is formed by bending a guide rail main plate with four sides that can be bent toward one side of the box side plate to form a support frame.

7. The portable detachable tool box of claim 2, wherein the guide rail auxiliary frame is formed by bending a guide rail auxiliary plate with four sides that can be bent toward one side of the drawer cavity to form a mounting frame.

8. The portable detachable tool box of claim 1, wherein the box side plate is detachably provided with a push-pull handrail.

9. An assembly process of the portable detachable tool box of claim 1, including the following steps:

S1: first, fitting the two box side plates to the box bottom plate, and fixing the box side plates and box bottom plate through screw holes at the bottom;

S2: then, stacking the plurality of drawer units in sequence from top to bottom through the drawer guide grooves of the box side plates;

S3: then, inserting the two back plate pieces into the box bottom plate through the inserting holes;

S4: finally, placing the box top plate on the drawer units through the drawer guide grooves of the box side plates, and fixing the box top plate, the box side plates, and the box back plate through screw holes on the top.

* * * * *